Aug. 23, 1960  R. J. GROEN ET AL  2,950,203
PROCESS OF QUICK-FREEZING RAW ONIONS
Filed March 26, 1957
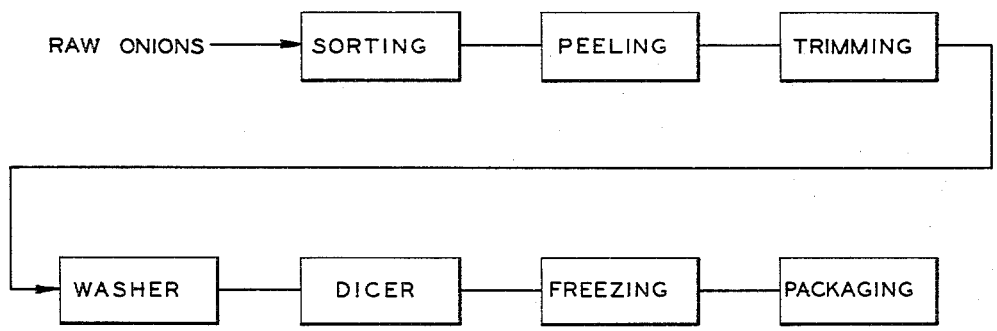
INVENTORS
REIN J. GROEN
WILLIAM A. RICE
BY *Allen & Chung*
ATTORNEYS

2,950,203
PROCESS OF QUICK-FREEZING RAW ONIONS

Rein J. Groen, 622 Woodham Road, and William A. Rice, 2357 Osborne Ave., both of Santa Clara, Calif.

Filed Mar. 26, 1957, Ser. No. 648,591

1 Claim. (Cl. 99—193)

The present invention relates to the quick freezing to packaging of raw onion products or raw onion pieces prepared from raw onions of the type which are placed on the market encased in a dry skin.

Heretofore it has been considered impossible to quick freeze raw onions properly because onions have a high moisture content and do not withstand a blanching step as they become unsuitable for freezing operations because of tissue breakdown.

We have discovered that by dividing the raw onions in suitable pieces such as diced onions, onion rings, or utilizing whole raw onions of a size comparable to onions commonly employed as stewing onions, the raw onions can be quick frozen satisfactorily without a blanching step, contrary to the belief in industry.

It is the general object of the invention theretofore to provide quick frozen raw onion products and a method of producing the products.

Another object of the invention is to provide quick frozen raw onions in the form of diced onions or onion rings.

Another object of the invention is to provide onions for use in a kitchen in raw form in a condition to store and retain their flavor indefinitely.

A further object of the invention is to provide a raw onion product which provides economy in use of onions for the housewife, the packer and the institutional user.

Other objects and advantages of the invention will be apparent from the following description of certain preferred methods and products taken in conjunction with the accompanying drawing which illustrates a suitable flow diagram in the quick freezing of raw onions.

The process is described as particularly related to raw onions of the type having a dry skin encasing them. The onions are first received from storage and sorted to remove undesirable raw product.

Following the sorting, the onions are peeled and trimmed to remove the dry outer peel and the root and stem end portions which are unedible as well as other undesirable portions found from inspection of the onions. After peeling and trimming the onions are conveyed to a washer of conventional form and subjected to a conventional washing operation.

After the washing step if the onions are to be cut into pieces, the onions are fed into conventional slicing and dicing apparatus where they are sliced and then diced. If the raw diced onions are to be frozen, the diced onions may be of the usual size specified by the U.S. Government for diced products or may be any convenient size. If raw onion rings are to be quick frozen, the onion slices are separated into rings and no dicing operation is performed.

Thereafter, in either case, the onion pieces are transferred as rapidly as possible to the freezing apparatus which may be of any conventional type. For example freezing may be accomplished with a cold forced air blast of zero degrees F. or lower for about 15′ to 25′, in accordance with common commercial practices, or carbon dioxide under pressure may be sprayed directly on the onion pieces. Regardless of the particular type of freezing process employed the onion pieces are preferably individually quick frozen as this term is understood in the quick freezing industry. This may be carried out, for example, by placing the onion pieces on a belt which is carried through a freezing chamber so that each individual onion piece is individually treated and frozen. It is important in any freezing operation that as little time as possible elapse from the cutting operation, such as slicing or dicing, until the freezing operation so that a minimum amount of flavor-carrying juices is lost. In some cases it may be desirable to freeze slices and then dice the frozen slices.

Throughout the entire process the temperature of the raw onions is maintaned at ambient atmospheric temperatures or lower so that no undesirable effects of heating are present in the flesh of the onions. By ambient atmospheric temperatures we mean temperatures which would affect the onion or onion pieces throughout their flesh.

Following the freezing step, the whole, diced or sliced raw onions are packaged in suitable containers such as the conventional waxed cartons commonly employed for frozen products.

The resulting product preferably is used immediately without any thawing and with a resultant economy because the entire onion product purchased can be employed for the particular product being cooked or prepared. Moreover frozen onions can be held in a freezer or freezing compartment of a refrigerator without danger of absorption of the odor by other foods. The frozen onions are always immediately available for use without any preparation step such as conventionally performed in using unfrozen raw onions.

While we have described certain preferred products and a preferred method of carrying out our invention it will be apparent that the invention is capable of variation and modification from the form described herein so that the scope thereof should be limited only by the proper scope of the claim appended hereto.

We claim:

The process of quick-freezing raw onions which comprises sorting the onions, peeling and trimming the onions to remove unedible and undesirable portions thereof, washing the peeled and trimmed onions, cutting the onions into pieces, carrying the onion pieces while unconfined through a freezing zone and effecting an individual freezing operation on each onion piece at least as cold as substantially zero degrees F., and then packaging the onion pieces, the entire process being carried out at substantially ambient atmospheric temperatures.

References Cited in the file of this patent

UNITED STATES PATENTS 2,771,370    Allen ----------------- Nov. 20, 1956

OTHER REFERENCES

"Food Manufacture," July 1949, pp. 301 to 305, inclusive.

"Make the Most of Your Food Freezer," by Mavie Armstrong Essipoff, pub. by Rhinehart and Co., New York, copyrighted in 1951 and 1954, pp. 89 to 94, inclusive.

"Agriculture Handbook No. 2," U.S. Dept. of Agriculture, page 17.

"Food and Food Products," vol. III, second edition, by Jacobs, page 1835.

"Quick Frozen Foods," May 1955, page 85.